March 19, 1957 N. O. ALDERSTAM ET AL 2,785,934
BEARING FOR THE CARRIAGES OF MACHINE TOOLS AND THE LIKE
Filed March 27, 1953
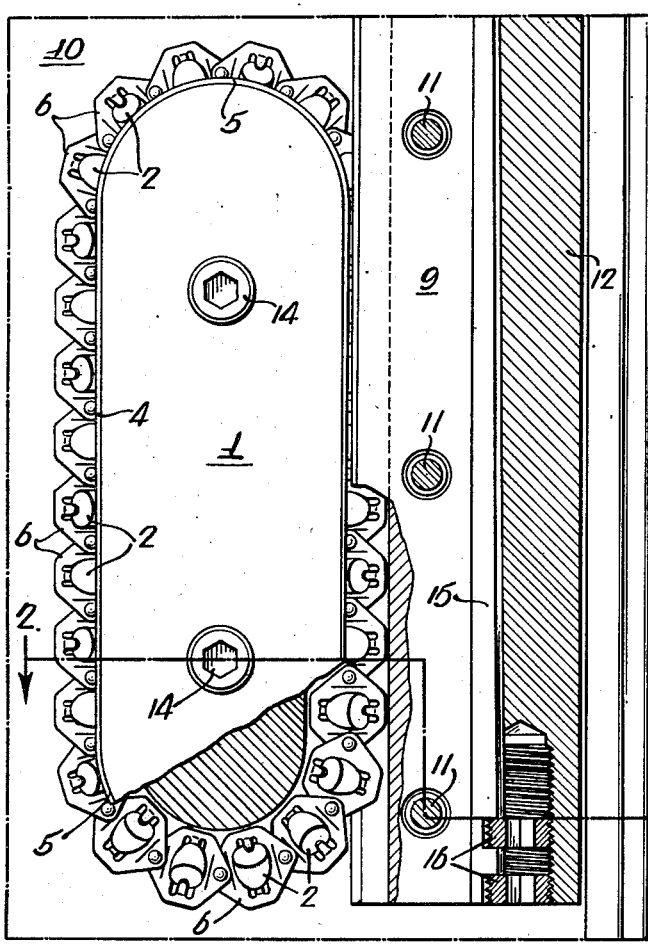
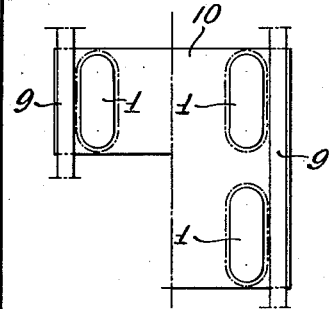
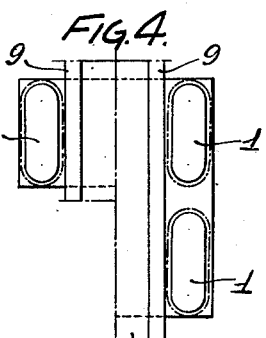
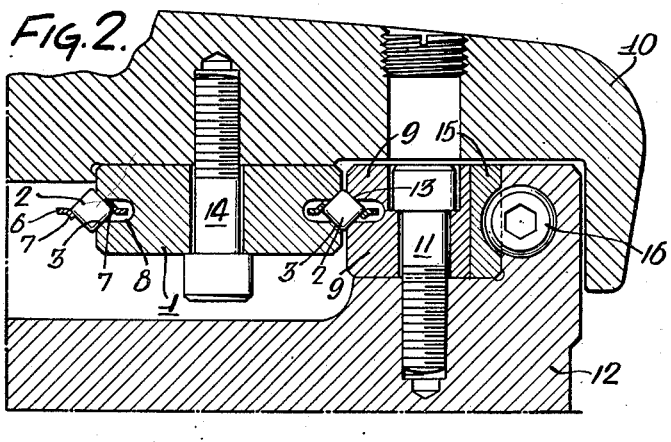
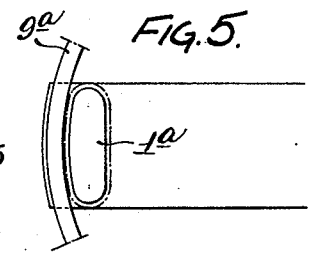
INVENTORS
NILS OLOF ALDERSTAM
JOHN TURE RUIST
BY THEIR ATTORNEYS
Howson & Howson United States Patent Office 2,785,934
Patented Mar. 19, 1957

2,785,934

BEARING FOR THE CARRIAGES OF MACHINE TOOLS AND THE LIKE

Nils Olof Alderstam, Utbynas, Goteborg, and John Ture Ruist, Goteborg, Sweden, assignors, by mesne assignments, to SKF Industries, Inc., Philadelphia, Pa., a corporation of Delaware Application March 27, 1953, Serial No. 345,098

Claims priority, application Sweden March 28, 1952

1 Claim. (Cl. 308—6)

As bearings for the carriages of machine tools and the like, it has been proposed to provide a chain of interconnected rolling bodies which roll between a pair of straight tracks and it has also been proposed to provide a device in which a series of rolling bodies are arranged in contact with each other in an endless row which revolves about a central member having a roller race, whereby the rolling bodies during part of the revolution pass between a pair of races. The first mentioned device suffers from the disadvantage that the rolling bodies do not satisfactorily support the carriage during the whole stroke. In devices according to the second proposal, it has been necessary to provide special means for returning the roller bodies to the loaded position and for retaining them in the bearing. These devices are therefore both expensive and inconvenient in that they require a spcial design for each case.

The purpose of the present invention is to provide a special bearing element which is cheap to manufacture and which can be used in widely varying applications without alteration. The device according to the invention comprises an inner member on which is provided a roller race which is partly straight or which has a radius of curvature greater than the radius of a circle circumscribed about the race and a number of cylindrical rollers arranged about the inner member and is characterized thereby, that the rollers are rotatably retained, each in one of a number of retaining elements interconnected to form an endless chain in such a manner that the axes of rotation of some of the rollers are oppositely inclined to the axes of rotation of the other rollers and that the rollers run in a V-shaped race in the inner member along at least a portion of the circumference thereof.

One form of the invention is shown in the accompanying drawing in which Fig. 1 shows a plan view of a bearing according to the invention partly in section. Fig. 2 shows a cross section through a portion of a machine slide in which a bearing member according to the invention has been applied and Figs. 3 and 4 show in diagram on a smaller scale a view from below of a slide in which bearing members have been applied in different ways. Fig. 5 shows a corresponding view of an oscillating slide.

The bearing member according to Fig. 1 comprises an inner member 1 about which is arranged a number of rollers 2. For this purpose, the member 1 is provided with a more or less oval race 3 which, in the form shown in the drawings, is straight at the sides 4 but blends tangentially with semi-circular end portions 5. The rolling bodies are in the present case cylindrical rollers, the length of which is only slightly less than the diameters. The rollers are assembled so that the axis of each roller inclines to the plane of the race and also to the axes of the immediately adjacent rollers at an angle of 90°. The race has therefore been made V-shaped, the angle of the V being 90°, as shown in Fig. 2. Each roller is mounted in a substantially plane retainer member 6, so that the axis of the roller forms an angle of 45° with the plane of the retainer member. The roller is retained in the retainer member by a pair of tongues 7 arranged one at each end of the roller. The retainer elements are rivetted together to form an articulated endless chain about the member 1. At the bottom of the race is provided a recess 8 for receiving the portions of the retainer members projecting beyond the roller ends. The member 1 thus forms together with the set of rollers a unit which can be assembled as required in many different ways.

One example of an application of this kind is shown in Fig. 2 in which 12 designates part of a machine frame and 10 designates part of a carriage movable thereon. A straight roller race member 9 is fixed to the frame by means of screws 11. This race member is provided with a race 13, similar to the race 3 on the member 1. The member 1 is fixed to the lower side of the carriage by means of a pair of screws 14, so that the carriage will be carrier by the rollers running in the races in the member 1 and in the race member 9. A similar bearing device (not shown) is mounted at the other side of the carriage. In order to adjust the play in the bearings a tapered member 15, having a small angle, is provided back of one of the members 9. The member 15 can be displaced lengthwise by means of a screw device 16.

In short carriages one bearing member at each side of the carriage will be sufficient, as shown at the left in Fig. 3. In longer carriages it may however be necessary to provide two or more such members at each side, as shown at the right in the figure. The straight race member extends along the whole race on the carriage, which is therefore well supported in all positions. In Fig. 3, the races are shown arranged on the outer side of the bearing members, while in Fig. 4, they are shown located between them. Fig. 5 shows a corresponding view of an oscillating slide. The race member 9a in this case forms an arc of a circle and the member 1 is also provided with an arcuate roller race. The radius of curvature of the arcuate race should be that as many rollers as possible may act simultaneously to support the slide.

Since the rollers are retained in a retainer they are carried by the groove in the member 1 and will revolve about this member during the movement on the slide without the provision of special devices, for instance return tubes or specially milled channels, as has been required in earlier known devices for this purpose. This simplifies the application and makes it cheaper and also makes it possible to use the device in places, where it would not otherwise be possible. The shape of the race results in that the carriage will be carried by a number of rolling bodies simultaneously which makes for a very rigid construction.

Other forms of the invention may be provided without departing from the spirit of the invention. Thus it is possible to use tapered rollers or balls. Complete races are required only along the straight race and on one side of the inner member while the other side of the inner member and the ends thereof require only a single shoulder race to carry the rollers. This part of the race may be formed of simple sheet metal parts or the like. The inner member can be shaped in different ways according to its field of use. For oscillating slides the straight race is changed to a race of suitable curvature. In certain cases, it may be found suitable to make the working portion of the race concave.

Having thus described our invention, we claim and desire to secure by Letters Patent the following:

In a machine tool, a frame, a carriage traversable in in predetermined path in said frame, and a bearing for said carriage comprising an inner carriage-supporting member having a peripheral roller race which over a major part at least of its length conforms linearly to said path and is generally V-shaped in cross section, a number of cylindrical rollers arranged about the periphery of the inner member and seating in said race with the axes of rotation of some of the rollers oppositely inclined to the axes of rotation of the other rollers with respect to the plane of the race, a retaining element for each of the rollers, means for interconnecting said elements to form an articulated endless chain, and means in each said retaining element engageable with the ends of the retained roller to prevent displacement of the roller from the race and to support the chain on the rollers so as to form a self-contained unit consisting of the chain, the rollers, and said inner member, and outer carriage-supporting means on the frame including a generally V-shaped groove confronting and coextensive with the said linearly conforming part of the race of said inner member and forming a complementary outer race for said rollers, the complementary races being extended in the direction of carriage movement so as to afford with the coactive rollers a rigid and stable support for the carriage.

References Cited in the file of this patent
UNITED STATES PATENTS

| | | |
|---|---|---|
| 543,720 | Berger | July 30, 1895 |
| 2,230,442 | Arms | Feb. 4, 1941 |
| 2,242,498 | Zwick | May 20, 1941 |
| 2,294,665 | Jackson | Sept. 1, 1942 |
| 2,349,824 | Irasek | May 30, 1944 |
| 2,628,137 | Ashton | Feb. 10, 1953 |
| 2,721,776 | Ruist | Oct. 25, 1955 |